(12) United States Patent
Wakui et al.

(10) Patent No.: US 7,415,255 B2
(45) Date of Patent: Aug. 19, 2008

(54) SCANNING RECEIVER

(75) Inventors: Kiyoshi Wakui, Tokyo (JP); Nobuaki Yokoyama, Tokyo (JP); Kazuo Kawai, Tokyo (JP)

(73) Assignee: General Research of Electronics, Inc. (JP)

( * ) Notice: Subject to any disclaimer, the term of this patent is extended or adjusted under 35 U.S.C. 154(b) by 685 days.

(21) Appl. No.: 11/070,120

(22) Filed: Mar. 2, 2005

(65) Prior Publication Data

US 2006/0057986 A1 Mar. 16, 2006

(30) Foreign Application Priority Data

Sep. 14, 2005 (JP) ............................. 2004-267113

(51) Int. Cl.
*H04B 1/18* (2006.01)
(52) U.S. Cl. ................. 455/130; 455/161.1; 455/161.2; 455/161.3; 455/165.1
(58) Field of Classification Search ................. 455/130, 455/134, 148, 150.1, 160.1, 161.1–161.3, 455/164.1–164.2, 165.1, 182.1–182.3, 183.1–183.2, 455/184.1, 318, 341, 208
See application file for complete search history.

(56) References Cited

U.S. PATENT DOCUMENTS

| | | | | |
|---|---|---|---|---|
| 5,555,451 | A * | 9/1996 | Kennedy et al. | ......... 455/161.2 |
| 5,842,119 | A * | 11/1998 | Emerson et al. | ......... 455/161.3 |
| 6,684,054 | B1 * | 1/2004 | Worthy | ....................... 455/2.01 |
| 6,807,405 | B1 * | 10/2004 | Jagger et al. | ................ 455/296 |
| 2002/0146996 | A1 * | 10/2002 | Bachman et al. | ............ 455/302 |
| 2005/0032485 | A1 * | 2/2005 | Bachman et al. | ......... 455/114.2 |
| 2005/0215266 | A1 * | 9/2005 | Tsien et al. | .................. 455/454 |
| 2005/0227648 | A1 * | 10/2005 | Tan | ......................... 455/154.1 |
| 2006/0128308 | A1 * | 6/2006 | Michael et al. | ............ 455/41.2 |
| 2007/0141979 | A1 * | 6/2007 | Brey | ........................ 455/3.06 |
| 2007/0264939 | A1 * | 11/2007 | Sugar | ...................... 455/67.11 |

FOREIGN PATENT DOCUMENTS

JP 09321581 12/1997

* cited by examiner

*Primary Examiner*—Pablo N Tran
(74) *Attorney, Agent, or Firm*—Trexler, Bushnell, Giangiorgi, Blackstone & Marr, Ltd.

(57) ABSTRACT

With the objective of providing a scanning receiver capable of capturing a target radio wave in an extremely short period of time by use of a simple constituting means, a plurality of wide frequency division bands in which a full frequency range is divided into predetermined frequency ranges are set and the field intensities of received radio waves are retrieved using the output of an intermediate frequency amplifier circuit over the set wide frequency division bands in order. Further, when a received radio wave having a field intensity greater than or equal to a prescribed level is obtained upon the above retrieval, receive frequencies are swept from one end of each of the wide frequency division bands to the other end thereof. When a target radio wave can be captured upon the above sweeping, transition to the operation of receiving the target radio wave is performed. When the target radio wave is not obtained, the retrieval of field intensities of received radio waves and the sweeping of receive frequencies following the retrieval are performed over the non-retrieved wide frequency division bands in a sequential order to capture the corresponding target radio wave.

1 Claim, 6 Drawing Sheets

SCANNING RECEIVER

BACKGROUND OF THE INVENTION

The present invention relates to a scanning receiver which selects and receives a target radio wave out of various radio waves, and particularly to a scanning receiver capable of capturing and receiving a target radio wave without the need for many scanning processes and a long selection time even if the propagation frequency of the target radio wave is unknown.

In general, a scanning receiver is operated so as to frequency-sweep a local oscillation frequency over a constant or predetermined frequency range and stop the sweeping of the local oscillation frequency when a target radio wave is captured and received by its frequency sweeping thereby to proceed to the reception of the target radio wave.

In such a scanning receiver, the sweeping of the local oscillation frequency has originally been performed using an analog means upon frequency-sweeping the local oscillation frequency. Therefore, when a firstly captured and received radio wave does not correspond to a target radio wave, the remaining frequency range is frequency-swept following its capturing to thereby capture the target radio wave. In such a case, information about the local oscillation frequency at the stop of the frequency sweeping cannot be stored perfectly. It was thus difficult to perform frequency sweeping over a wide band frequency range and thereby capture and receive a target radio wave.

Thereafter, with rapid development of digital technology substituted for analog technology, the digital technology has been used in the frequency sweeping of the local oscillation frequency even in the field of scanning receivers. Thus, a scanning receiver that makes use of a digital memory means has become developed.

In recent years, computer processing technology and LSI (Large Scale Integration) manufacturing technology have greatly been advanced and global homogenization in the allocation of frequencies of radio waves has been made. Therefore, receivers each using a PLL (Phase Locked Loop) frequency synthesizer in the generation of a local oscillation signal have increased. Even in the case of a scanning receiver, one using such a PLL frequency synthesizer has become mainstream.

On the other hand, the scanning receiver needs to take into consideration the following points when the PLL frequency synthesizer is used in the generation of the local oscillation signal. That is, when the propagation frequency of a target radio wave is perfectly unknown, the scanning receiver must scan received radio waves over an extremely wide frequency range to capture and receive the target radio wave in order to capture and receive the corresponding target radio wave. The reason for this is as follows: When the frequency allocations of actual various radio waves are viewed, they are given at alternate-12.5 kHz frequency intervals or at alternate-25 kHz frequency intervals depending upon frequency bands (such allocated positions of radio waves hereinafter be called "channels"). Therefore, in order to capture and receive the target radio wave by the scanning receiver, there is a need to sequentially capture and receive the respective channels at above frequency intervals over the full frequency range in which effective radio waves are placed, regardless of the presence or absence of allocation of the radio waves.

In this case, the scanning receiver needs to frequency-change the local oscillation frequency generated by the PLL frequency synthesizer in such a manner that the local oscillation frequency is sequentially synchronized with the propagation frequencies of the radio waves placed at above frequency intervals. Since a frequency switching time of about 10 ms per channel is normally required where the local oscillation frequency of the PLL frequency synthesizer is frequency-changed so as to be synchronized with the propagation frequencies of the respective radio waves, a considerable time might be required until the wide frequency range in which the effective radio waves exist, is frequency-swept to capture and receive the target radio wave.

Even in the case where it is expected that, for example, a transmitting station transmitting a target radio wave is at a fairly near distance and the field intensity of the target radio wave will be relatively large, the need to take a considerable time is also by no means rare until the target radio wave is captured and received.

In consideration of the fact that time is extremely taken to capture and receive such a target radio wave, the shortening of the time taken to capture the target radio wave has been thought out in the field of a sweeping receiver containing this type of scanning receiver. A receiver disclosed in a patent document 1 (Japanese Unexamined Patent Publication No. Hei 09(1997)-321581) has been proposed as one example.

The receiver disclosed in Japanese Unexamined Patent Publication No. Hei 09(1997)-321581 is one of such a type that two receiving sections corresponding to a main receiving section and a sub receiving section configured substantially in the same scale are provided, and while any receiving radio wave is being received by the receiving operation of the main receiving section, the sub receiving unit performs a sweeping operation to detect the following received radio wave, and data about the detected received radio wave is stored in a memory, and that when a skip signal is supplied to the main receiving section, the main receiving section receives the next received radio wave on the basis of the received radio wave data stored in the memory. Thus, since the main receiving section is capable of receiving the following radio wave promptly even if the speed of frequency sweeping at the sub receiving section is not so fast, the frequency sweeping operation can apparently be speeded up looking overall.

Although the receiver disclosed in Japanese Unexamined Patent Publication No. Hei 09(1997)-321581 is capable of apparently speeding up the frequency sweeping operation by cooperation between the main receiving section and the sub receiving section and thereby shortening time taken to capture the target radio wave, it is necessary to provide the sub receiving section substantially identical in constitutional scale to the main receiving section in addition to the provision of the originally-required main receiving section. Therefore, the receiver becomes large in constitutional scale on the whole but also increases in the number of required components, thereby resulting in a great increase in manufacturing cost.

SUMMARY OF THE INVENTION

The present invention has been made in view of such a background art. It is therefore an object of the present invention to provide a scanning receiver capable of capturing and receiving a target radio wave in an extremely short period of time by a simple means which sets a plurality of wide frequency division bands in which a full receive frequency range required to be scanned is divided into relatively wide frequency ranges and retrieves received signal levels of these wide frequency division bands to select the wide frequency division band having a high possibility that the target radio wave will be contained, and scans the selected wide frequency division band at a normal receiving band.

In order to attain the above object, there is provided a scanning receiver according to one aspect of the present invention, comprising a PLL frequency synthesizer used to generate a local oscillation signal, and a microprocessor, the local oscillation signal being swept under the control of the microprocessor to perform retrieval of field intensities of received radio waves and sweeping of receive frequencies thereof, wherein the microprocessor is equipped with a first means that sets a plurality of wide frequency division bands in which a receivable full frequency range is divided into predetermined frequency ranges and retrieves the field intensities of the received radio waves using the output of an intermediate frequency amplifier circuit over the set wide frequency division bands in order, that when a received radio wave having a field intensity greater than or equal to a prescribed level is obtained by the retrieval, sweeps the receive frequencies from one end of the corresponding wide frequency division band to the other end thereof, that when a target radio wave is capable of being captured upon the sweeping, proceeds to the operation of receiving the target radio wave, and that when the target radio wave is not obtained, performs the retrieval of the field intensities of the received radio waves and the sweeping of the receive frequencies following the retrieval on the non-retrieved wide frequency division bands in order to thereby capture a corresponding target radio wave.

Also in order to attain the above object, there is provided a scanning receiver according to another aspect of the present invention, comprising a PLL frequency synthesizer used to generate a local oscillation signal, and a microprocessor, the local oscillation signal being swept under the control of the microprocessor to perform retrieval of field intensities of received radio waves and sweeping of receive frequencies thereof, wherein the microprocessor is equipped with a second means that sets a plurality of wide frequency division bands in which a receivable full frequency range is divided into constant frequency ranges and retrieves the field intensities of the received radio waves using the output of an intermediate frequency amplifier circuit over the set wide frequency division bands in order, that each time received radio waves each having a field intensity greater than or equal to a prescribed level are obtained by the retrieval, stores band information indicative of the wide frequency division bands into a memory, that when the retrieval of all the wide frequency division bands is completed, selects the wide frequency division bands corresponding to the band information stored in the memory in order, and sweeps the receive frequencies from one ends of the selected respective wide frequency division bands to the other ends thereof respectively, that when a target radio wave is capable of being captured upon the sweeping, proceeds to the operation of receiving the target radio wave, and that when the target radio wave is not obtained, sweeps the receive frequencies over the remaining wide frequency division bands to thereby capture a corresponding target radio wave.

Further, in order to attain the above object, there is provided a scanning receiver according to a further aspect of the present invention, comprising a PLL frequency synthesizer used to generate a local oscillation signal, and a microprocessor, the local oscillation signal being swept under the control of the microprocessor to perform retrieval of field intensities of received radio waves and sweeping of receive frequencies thereof, wherein the microprocessor is equipped with a third means that sets a receivable full frequency range to a plurality of wide frequency division bands divided into constant frequency ranges and a plurality of mid frequency division bands in which the respective wide frequency division bands are divided into constant mid frequency ranges corresponding to frequency ranges respectively narrower than the wide frequency ranges, and retrieves the field intensities of the received radio waves using the output of an intermediate frequency amplifier circuit over the set wide frequency division bands in order, that when received radio waves each having a field intensity greater than or equal to a prescribed level are obtained by the retrieval, retrieves the field intensities of the received radio waves using the output of an intermediate frequency amplifier circuit over the mid frequency division bands respectively set to the wide frequency division bands in order, that when a received radio wave having a field intensity greater than or equal to a prescribed level is obtained by the retrieval, sweeps the receive frequencies from one end of the corresponding mid frequency division band to the other end thereof, that when a target radio wave is capable of being captured upon the sweeping, proceeds to the operation of receiving the target radio wave, that when the target radio wave is not obtained, performs the retrieval of the field intensities of the received radio waves and the sweeping of the receive frequencies on the remaining mid frequency bands, that when the target radio wave is not obtained at this time, performs the retrieval of field intensities at the non-retrieved remaining wide frequency division bands, the retrieval of field intensities at the mid frequency division bands in the wide frequency division band selected by the retrieval and the sweeping of receive frequencies following the retrieval of the field intensities at the mid frequency division bands to thereby capture a corresponding target radio wave.

According to the scanning receiver according to the one aspect of the present invention, the procedure of retrieving the field intensities of the received radio waves in order at the respective wide frequency division bands set by the microprocessor, and, when the received radio waves each greater than or equal to a prescribed field intensity are found to exist as a result of their retrieval, sweeping the wide frequency division bands and sequentially selecting all received radio waves lying therein is repeatedly executed until a target radio wave is captured, whereby the target radio wave is captured and received. Therefore, the present scanning receiver brings about advantageous effects in that if the field intensity of the target radio wave is greater than or equal to a prescribed value even if the propagation frequency of the target radio wave is unknown, then the target radio wave can be captured and received in a short period of time, and even if the propagation frequency of a target radio wave is unknown and the received field intensity of the target radio wave is slightly lower than the prescribed value, the target radio wave can be captured and received by slightly reducing the prescribed value of the field intensity upon retrieval of each field intensity, and the mere use of a relatively simple means as a constituting means of the scanning receiver makes it possible to capture a target radio wave within a considerably short period of time as compared with such a known scanning receiver that all received radio waves in an effective frequency range are sequentially selected to obtain the corresponding target radio wave.

According to the scanning receiver according to another aspect of the present invention as well, the procedure of retrieving the field intensities of the received radio waves at the respective wide frequency division bands set by the microprocessor, storing the band information indicative of the wide frequency division bands in the memory each time the received radio waves each greater than or equal to a prescribed field intensity exist upon their retrieval, and, when the retrieval of the field intensities at the respective wide frequency division bands is completed, sequentially selecting the corresponding wide frequency division bands on the basis of the band information stored in the memory and sweeping each selected wide frequency division band to select all received radio waves lying therein is repeatedly executed until a target radio wave is captured, whereby the target radio wave is captured and received. Therefore, the scanning receiver brings about advantageous effects in that if the field intensity of the target radio wave is greater than or equal to a prescribed value even if the propagation frequency of the target radio wave is unknown, then the target radio wave can be captured and received within a short period of time, and even if the propagation frequency of a target radio wave is unknown and the received field intensity of the target radio wave is slightly lower than the prescribed value, the target radio wave can be captured and received by slightly reducing the prescribed value of the field intensity upon retrieval of each field intensity, and the mere use of a relatively simple means as a constituting means of the scanning receiver makes it possible to capture a target radio wave within a considerably short period of time as compared with such a known scanning receiver that all received radio waves in an effective frequency range are sequentially selected to obtain the corresponding target radio wave.

Further, according to the scanning receiver according to the further aspect of the present invention, the procedure of retrieving the field intensities of received radio waves at the respective wide frequency division bands set by the microprocessor, retrieving the field intensities of the received radio waves at the mid frequency division bands in the wide frequency division bands set by the microprocessor if the received radio waves each greater than or equal to a prescribed field intensity exist upon their retrieval, and, if the received radio waves each greater than or equal to the prescribed field intensity exist upon the above retrieval, sweeping their mid frequency division bands and sequentially selecting all received radio waves lying therein is repeatedly executed until the target radio wave is captured, whereby the corresponding target radio wave is captured and received. Therefore, the present scanning receiver brings about advantageous effect in that if the field intensity of the target radio wave is greater than or equal to a prescribed value even if the propagation frequency of the target radio wave is unknown, then the target radio wave can be captured and received in a short period of time, and even if the propagation frequency of a target radio wave is unknown and the received field intensity of the target radio wave is slightly lower than the prescribed value, the target radio wave can be captured and received by slightly reducing the prescribed value of the field intensity upon retrieval of the field intensities of both the wide frequency division bands and the mid frequency division bands, and the mere use of a relatively simple means as a constituting means of the scanning receiver makes it possible to capture a target radio wave within a considerably short period of time as compared with such a known scanning receiver that all received radio waves in an effective frequency range are sequentially selected to obtain the corresponding target radio wave.

Other features and advantages of the present invention will become apparent upon a reading of the attached specification.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENTS

Preferred embodiments of the present invention will hereinafter be explained with reference to the accompanying drawings.

First and Second Preferred Embodiments

Figure 1:
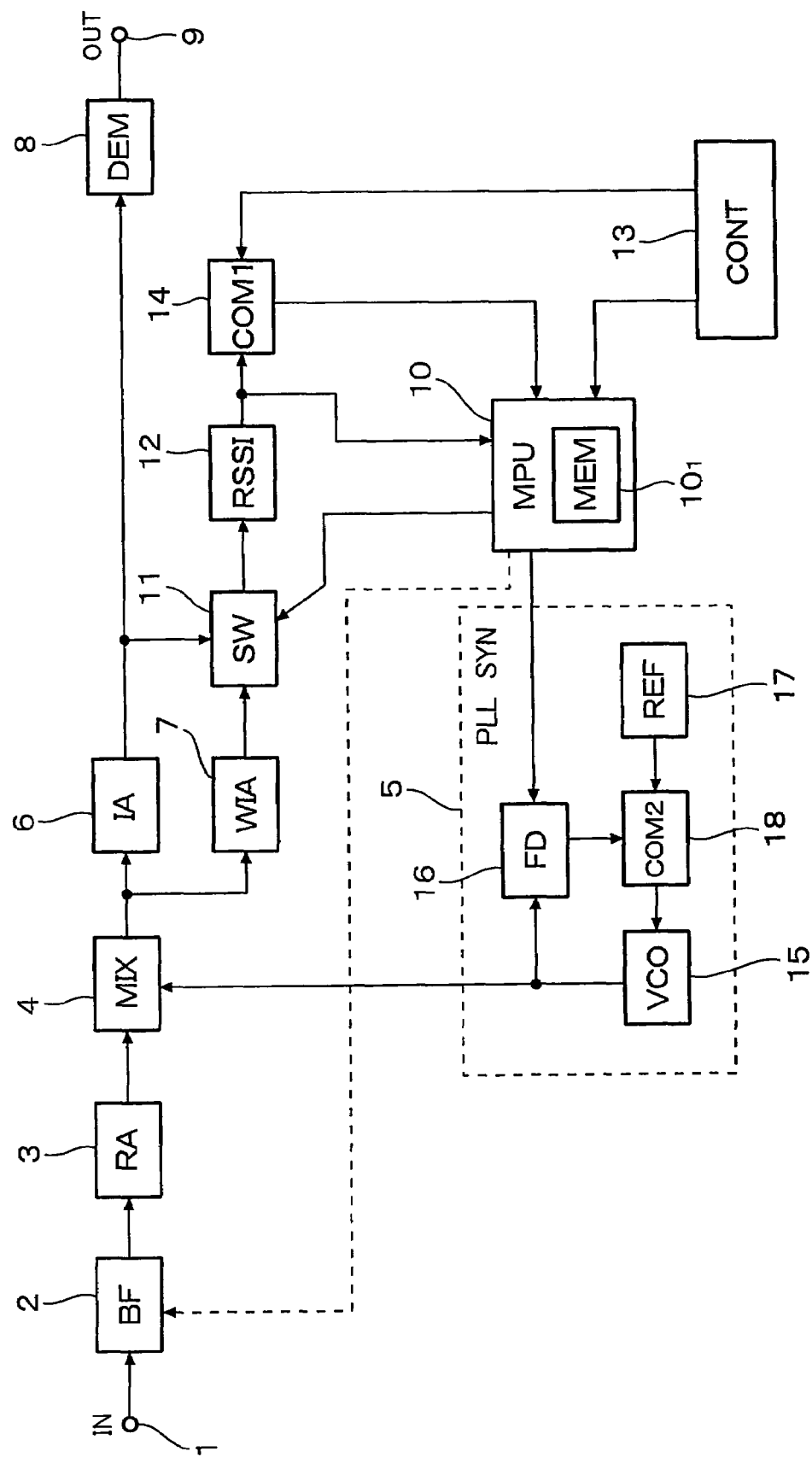
FIG. 1 shows first and second embodiments of a scanning receiver according to the present invention and is a block diagram showing a fragmentary configuration of the scanning receiver.

FIG. 1 shows first and second embodiments of a scanning receiver according to the present invention and is a block diagram illustrating a fragmentary configuration of the scanning receiver.

As shown in FIG. 1, the scanning receiver according to the first and second embodiments comprises a high frequency signal input terminal (IN) 1, a signal band selection filter (BF) 2, a high frequency amplifier (RA) 3, a frequency mixer (MIX) 4, a PLL frequency synthesizer (PLL SYM) 5, an intermediate frequency amplifier (IA) 6 whose pass band is equal to a normal intermediate frequency band, a wide band intermediate frequency amplifier (WIA) 7 whose pass band is equal to a wide frequency division band to be described later, a demodulator (DEM) 8, a demodulated signal output terminal (OUT) 9, a microprocessor (MPU) 10 with a memory $10_1$ built therein, a signal switcher (SW) 11, a received signal strength indicator (RSSI) 12, a controller (CONT) 13, a first comparator (COM 1) 14, a voltage-controlled oscillator (VCO) 15, a frequency divider (FD) 16, a reference frequency signal generator (REF) 17, and a second comparator (COM 2) 18. In this case, the PLL frequency synthesizer 5 comprises the voltage-controlled oscillator 15, the frequency divider 16, the reference frequency signal oscillator 17 and the second comparator 18.

Then, the signal band selection filter 2 has an input terminal connected to the high frequency signal input terminal 1, and an output terminal connected to an input terminal of the high frequency amplifier 3. The frequency mixer 4 has a first input terminal connected to an output terminal of the high frequency amplifier 3, a second input terminal connected to an output terminal of the PLL frequency synthesizer 5, and an output terminal connected to respective input terminals of the intermediate frequency amplifier 6 and the wide band intermediate frequency amplifier 7. The intermediate frequency amplifier 6 has an output terminal connected to an input terminal of the demodulator 8 and a first switching input terminal of the signal switcher 11. The wide band intermediate frequency amplifier 7 has an output terminal connected to a second switching input terminal of the signal switcher 11. The demodulator 8 has an output terminal connected to a demodulated signal output terminal 9.

The microprocessor 10 has a control output terminal connected to a control terminal of the signal switcher 11 and another control output terminal connected to a control terminal of the PLL frequency synthesizer 5. The signal switcher 11 has an output terminal connected to an input terminal of the received signal strength indicator 12. The received signal strength indicator 12 has an output terminal connected to a first input terminal of the first comparator 14 and a control input terminal of the microprocessor 10. The controller 13 has one output terminal connected to a control terminal of the microprocessor 10 and the other output terminal connected to a second input terminal of the first comparator 14. The first comparator 14 has an output terminal connected to a control terminal of the microprocessor 10.

In the PLL frequency synthesizer 5, the voltage-controlled oscillator 15 has an output terminal connected to the output terminal of the PLL frequency synthesizer 5 and a division signal input terminal of the frequency divider 16, and a control terminal connected to a control voltage output terminal of the second comparator 18. The frequency divider 16 has a control terminal connected to the control terminal of the PLL frequency synthesizer 5, and an output terminal connected to a first input terminal of the second comparator 18. The second comparator 18 has a second input terminal connected to an output terminal of the reference frequency signal generator 17.

Although not shown in the figure, the controller 13 has at least a frequency range selecting member which selects a frequency range of a received radio wave, a scan starting member which causes scanning of the frequency range to start, a reception selecting member which causes the captured received radio wave to transition to a receiving state, a reception non-selecting member which causes the captured received radio wave to skip, and a field intensity setting member which sets a prescribed field intensity of the received radio wave. These respective members are respectively comprised of manipulable members such as control buttons, operating switches, etc. In this case, the controller 13 may preferably be provided with both the reception selecting member and the reception non-selecting member. However, only either one of them may preferably be provided for the controller 13. Then, the results of operations of the frequency range selecting member, the scan starting member, the reception selecting member and/or reception non-selecting member are supplied to the microprocessor 10 as control signals. The result of operation of the filed intensity setting member is supplied to the first comparator 14 as a set voltage.

Meanwhile, the frequency range of a radio wave intended for reception by this type of scanning receiver may include, as typical examples, four: a frequency range of 25-54 MHz, a frequency range of 108-174 MHz, a frequency range of 406-512 MHz and a frequency range of 806-960 MHz. In this case, the scanning receiver is one in which the frequency range of the radio wave intended for reception is determined depending upon the form of usage of the receiver. The scanning receiver may be one capable of receiving a radio wave lying in any one of the four frequency ranges, one capable of receiving radio waves lying in any two or three of the four frequency ranges respectively, or one capable of receiving radio waves lying in the four frequency ranges.

When the scanning receiver corresponds to one that receives only the radio wave lying in any one of the four frequency ranges, a pass frequency fixed signal band selection filter 2 which causes a received signal lying in one frequency range to selectively pass therethrough, is selected as the signal band selection filter 2 used therefor. When the scanning receiver corresponds to one that receives the radio waves lying in the two or more of the four frequency ranges, a pass frequency variable signal band selection filter 2 which performs switching so as to cause received signals lying in any two or more of the four frequency ranges to selectively pass therethrough under the control of the microprocessor 10, is selected as the signal band selection filter 2 used therefor. When the pass frequency variable signal band selection filter 2 performs switching between the pass bands, their switching is performed by operating the frequency range selecting member of the controller 13. As the switching form or type of the pass frequency variable signal band selection filter 2, may be one wherein one of two through four signal band selection filters 2 connected in parallel, which are different in signal band, is selected. Alternatively, it may be one wherein the impedance values of components of one pass frequency variable signal band selection filter 2 are selectively switched.

When the radio waves lying in one or two or more frequency ranges selected from the four frequency ranges are captured and received, the scanning receiver sets, prior to the capture and reception of the received radio waves, a plurality of wide frequency division bands in which a target or objective frequency range is divided into a plurality of constant or predetermined frequency ranges, in the present embodiment, a plurality of wide frequency division bands each having a frequency band of 1 MHz, and retrieves the present or absence of received radio waves each having a prescribed field intensity or more with respect to the respective set wide frequency division bands in order. When the received radio waves each having the prescribed field intensity or more are obtained from the retrieval, the scanning receiver sweeps the corresponding wide frequency division bands following the retrieval to thereby capture the received radio waves and hence capture and receive the corresponding target radio wave.

In this case, the retrieval of the presence or absence of the received radio waves each having the prescribed filed intensity or more at the respective wide frequency division bands is carried out by sweeping a local oscillation frequency and thereby retrieving only the presence or absence of the received radio waves in the wide frequency division bands. Unlike such capturing of received radio waves as to be described later, the time required to retrieve one wide frequency division band may be over one-tenth of the time required to capture a received radio wave in the same wide frequency division band to under one-tenth thereof.

Figure 2:
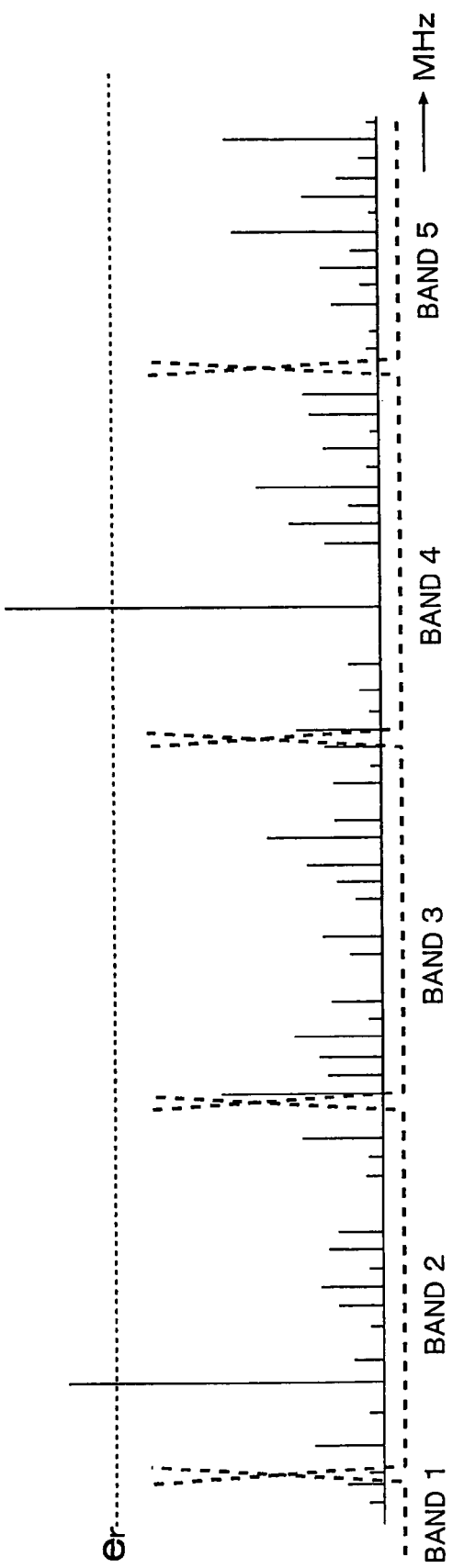
FIG. 2 is an explanatory diagram illustrating a state in which one frequency range is divided into a plurality of wide frequency division bands.

Now, FIG. 2 is an explanatory diagram showing a state in which one frequency range is divided into a plurality of wide frequency division bands and illustrates one example of a distribution of received waves at some of the wide frequency division bands in conjunction with it.

In FIG. 2, the direction of its horizontal axis indicates the frequency expressed in MHz. In the present example, five wide frequency division bands corresponding to bands 1, 2, 3, 4 and 5 whose frequency bands are 1 MHz, are shown. The direction of its vertical axis indicates a field intensity of a received radio wave. While the manner in which a plurality of received radio waves exist in the bands 1 through 5 respectively, is being shown in the present example, the manner in which received radio waves each exceeding a prescribed field intensity (er) exist in the bands 2 and 5 one by one respectively, is illustrated therein. Incidentally, the five wide frequency division bands corresponding to the bands 1, 2, 3, 4 and 5 shown in FIG. 2 are represented as only some of the full or overall frequency range. Many wide frequency division bands exist even in unillustrated parts.

The operation of the scanning receiver according to the present embodiment will hereinafter be described using FIGS. 1 and 2. However, this description will be made assuming that the frequency range selecting member of the controller 13 is operated by a user of the scanning receiver and thereby one frequency range intended for reception, e.g., the frequency range of 25-54 MHz has already been determined.

When the user of the scanning receiver first operates the scan starting member of the controller 13, the microprocessor 10 supplies a first division signal to the frequency divider 16 of the PLL frequency synthesizer 5 in response to the operation of the scan starting member to cause the frequency divider 16 to frequency sweep the oscillation frequency of the PLL frequency synthesizer 5 at the first wide frequency division band of 1 MHz of the frequency range. Further, the microprocessor 10 supplies an input switching signal to the signal switcher 11 to connect the output terminal of the wide band intermediate frequency amplifier 7 and the signal switcher 11. When a received radio wave is found to exist in the first wide frequency division band by the frequency sweeping of the PLL frequency synthesizer 5 at this time, its received signal and a frequency sweep signal are frequency-mixed at the frequency mixer 4. The resultant frequency-mixed signal is amplified by the wide band intermediate frequency amplifier 7 as a wide band intermediate frequency signal, which in turn is supplied to the received signal strength indicator 12 through the signal switcher 11.

The received signal strength indicator 12 generates a signal strength voltage indicative of a received signal strength of the received radio wave in response to the inputted wide band intermediate frequency signal. At this time, the first comparator 14 compares the signal strength voltage supplied to the first input thereof and a prescribed voltage indicative of a prescribed field intensity supplied to the second input thereof from the controller 13 and supplies a signal indicative of the result of comparison to the microprocessor 10. When the signal strength voltage of the received radio wave is indicative of being equal to or greater than a prescribed value, depending upon the supplied signal, the microprocessor 10 stores band information indicative of the corresponding wide frequency division band into the memory 10$_1$ and at the same time stops retrieval of the wide frequency division band under the control thereof and proceeds to capturing of the received radio wave at the wide frequency division band following its retrieval.

On the other hand, when the signal strength voltage of the received radio wave is indicative of being smaller than the prescribed voltage depending upon the supplied signal, the microprocessor 10 continues retrieval at the wide frequency division band without any storage into the memory 10$_1$. Then, when it is not possible to obtain the corresponding received radio wave whose signal strength is equal to or greater than the prescribed value as a result of the retrieval of the received radio wave with respect to the wide frequency division band, the microprocessor 10 supplies the following division signal to the frequency divider 16 of the PLL frequency synthesizer 5 to cause it to frequency-sweep the oscillation frequency of the PLL frequency synthesizer 5 at the following wide frequency division band of 1 MHz, after which the microprocessor 10 continues to retrieve the presence or absence of a received radio wave whose signal strength is equal to or greater than the prescribed value, in a manner similar to the above.

Thereafter, the microprocessor 10 performs the same operation on the respective wide frequency division bands in sequence to retrieve the presence or absence of received radio waves whose signal strengths are equal to or greater than the prescribed value. When the corresponding received radio wave whose signal strength is equal to or greater than the prescribed value, is found to exist, the microprocessor 10 stores band information indicative of its corresponding wide frequency division band into the memory 10$_1$. At the same time, the microprocessor 10 stops the retrieval of the wide frequency division band under the control thereof and proceeds to capturing of each received radio wave at the wide frequency division band.

When the microprocessor 10 proceeds to the capturing of the received radio wave, it supplies a first division signal to the frequency divider 16 of the PLL frequency synthesizer 5 to cause it to frequency-sweep the oscillation frequency of the PLL frequency synthesizer 5 at the corresponding wide frequency division band. Further, the microprocessor 10 supplies an input switching signal to the signal switcher 11 to connect the output terminal of the intermediate frequency amplifier 6 and the signal switcher 11. When the microprocessor 10 determines that a received radio wave exists in the wide frequency division band, depending upon the frequency sweeping of the PLL frequency synthesizer 5 even at this time, its received signal and a frequency sweep signal are frequency-mixed at the frequency mixer 4. The resultant frequency-mixed signal is amplified by the intermediate frequency amplifier 6 as an intermediate frequency signal, which in turn is supplied to the received signal strength indicator 12 through the signal switcher 11.

The received signal strength indicator 12 generates a signal strength voltage indicative of the field intensity of the received radio wave in response to the inputted intermediate frequency signal. The first comparator 14 compares the signal strength voltage supplied to the first input thereof and the prescribed voltage indicative of the prescribed field intensity supplied from the controller 13 to the second input thereof and supplies a signal indicative of the result of comparison to the microprocessor 10. When the signal strength of the received radio wave is found to be equal to or greater than the prescribed value according to the supplied signal, the microprocessor 10 fixes a division signal for the frequency divider 16 of the PLL frequency synthesizer 5 under the control thereof to stop frequency sweeping of the PLL frequency synthesizer 5, thereby temporarily capturing the received radio wave at this time. The captured received signal thereof is demodulated by the demodulator 8, after which the contents of the demodulated signal is confirmed by a user.

When the received radio wave is found to be a target radio wave as a result of the confirmation of the contents thereof, the user operates the reception selecting member of the controller 13. Thus, the scanning receiver is able to continuously receive the corresponding received radio wave subsequently. On the other hand, when the received radio wave is found not to be of the target radio wave as a result of the confirmation of the contents thereof, the user operates the reception non-selecting member of the controller 13. Thus, the scanning receiver temporarily skips radio waves being in reception and continues to capture received radio waves again.

When it cannot be confirmed that even though the capturing of each received radio wave is effected on the full range of the corresponding wide frequency division band, the received radio waves correspond to the target radio wave, the microprocessor 10 returns to the retrieval of the received radio waves again and executes the retrieval of each received radio wave on the remaining wide frequency division bands in order in like manner. Upon retrieval of each received radio wave, the microprocessor 10 retrieves the presence or absence of received radio waves each equal to or greater than a prescribed value in signal strength at the respective wide frequency division bands in a manner similar to above. When the received radio wave equal to or greater than the prescribed value in signal strength is found to exist therein, the microprocessor 10 stores band information indicative of the wide frequency division band for such a received radio wave in the memory $10_1$. At the same time, the microprocessor 10 stops the retrieval of the wide frequency division band under the control thereof and then proceeds to capturing of the received radio waves at the wide frequency division band. On the other hand, when the signal strength of the received radio wave is found to be smaller than the prescribed value upon retrieval of each received radio wave, the microprocessor 10 continues to retrieve each received radio wave at the wide frequency division band without any storage into the memory $10_1$.

When the microprocessor 10 proceeds to the operation of capturing of each received radio wave, it executes the capturing of the corresponding received radio wave at the wide frequency division band. When it is confirmed that when the capturing of the received radio wave at the wide frequency division band is performed, the temporarily-captured received radio wave corresponds to the target radio wave, the microprocessor 10 causes the scanning receiver to proceed to the continuous reception of the target radio wave. On the other hand, when it cannot be confirmed that the temporarily-captured received radio wave corresponds to the target radio wave, the microprocessor 10 returns to the retrieval of received radio waves at the wide frequency division bands and hereafter repeatedly executes the retrieval of each received radio wave and the capturing thereof following the retrieval in like manner.

When it is not possible to confirm the target radio wave even if the retrieval of the received radio wave and the capturing thereof following its retrieval are effected on all of the wide frequency division bands, it is judged that the field intensity of the target radio wave is not so strong. Thus, the field intensity setting member of the controller 13 is adjusted to make it possible to slightly reduce the set voltage supplied to the first comparator 14. If the retrieval of received radio waves at the respective wide frequency division bands and the capturing thereof following the retrieval thereof are carried out again using the reduced set voltage, then the probability that the target radio wave will be capable of being confirmed, becomes high as compared with before the reduction in set voltage.

Thus, according to the first embodiment, since the retrieval of the received radio wave at each wide frequency division band and the capturing thereof following it are performed, the time required to enable confirmation of the target radio wave since the start of the retrieval of the received radio wave can greatly be shortened as compared with the time necessary for the known sweeping receiver.

A second embodiment of a scanning receiver according to the present invention will next be explained.

The second embodiment is apparently identical in configuration to the first embodiment shown in FIG. 1. The configuration of the second embodiment is common to that of the already described first embodiment and the description thereof will therefore be omitted.

While the second embodiment is being identical to the first embodiment in terms of the basic operation that the retrieval of the received radio wave at each wide frequency division band and the capturing thereof following its retrieval are performed, it is different therefrom in that the second embodiment proceeds to the capturing of the received radio wave following its retrieval. The points of difference in operation between the second embodiment and the first embodiment will hereinafter be explained mainly.

The present embodiment is identical to the first embodiment in that when a user starts to retrieve each received radio wave, a microprocessor 10 retrieves received radio waves at respective wide frequency division bands in order, and when the corresponding received radio wave exceeding a prescribed field intensity is found to exist upon their retrieval, the microprocessor 10 stores band information indicative of the corresponding wide frequency division band into a memory $10_1$. In the second embodiment, however, even if the received radio wave exceeding the prescribed field intensity is found to exist, the microprocessor 10 retrieves received radio waves at all the remaining wide frequency division bands, respectively, containing the corresponding wide frequency division band without stopping the retrieval of the corresponding wide frequency division band and proceeding to capturing of the received radio wave at the corresponding wide frequency division band. When the corresponding received radio waves each exceeding the prescribed field intensity are found to exist in the respective wide frequency division bands, the microprocessor 10 successively stores band information indicative of the wide frequency division bands into the memory $10_1$ in several each time the received radio waves each exceeding the prescribed field intensity exist, and proceeds to capturing of the received radio waves when the retrieval of the received radio waves with respect to all the wide frequency division bands is completed.

When the microprocessor 10 has proceeded to capturing of the received radio waves, it selects the respective wide frequency division bands corresponding to the band information in sequence on the basis of the band information stored in the memory $10_1$ and captures the received radio wave from each selected wide frequency division band in accordance with the operation similar to the operation at the capturing of each received radio wave in the first embodiment. When the captured radio wave corresponds to the received radio wave exceeding the prescribed field intensity, the microprocessor 10 temporarily captures the received radio wave. When, at this time, the user confirms that the temporarily-captured received radio wave corresponds to a target radio wave, the microprocessor 10 sets the target radio wave in such a manner that it is continuously received. On the other hand, if the user is not able to confirm that the temporarily-captured received radio wave corresponds to the target radio wave, the microprocessor 10 continues to capture received radio waves in like manner until it is possible to confirm the target radio wave at all of the selected wide frequency division bands.

In the second embodiment, when it is not possible to confirm the target radio wave even though the retrieval of the received radio waves at all the wide frequency division bands and the capturing of the received radio wave at the selected wide frequency division band following the retrieval are carried out, it is possible to judge that the field intensity of the target radio wave is not so strong, and adjust the field intensity setting member of the controller 13 to slightly reduce the set voltage supplied to the first comparator 14. If such a reduced set voltage is used to carry out retrieval of received radio waves at all the wide frequency division bands and capturing of the corresponding received radio wave at the selected wide frequency division band following the retrieval again, then the probability becomes high that the corresponding radio wave can be confirmed as the target radio wave as compared with before the set voltage is reduced.

Thus, according to the second embodiment, the retrieval of the received radio waves at all the wide frequency division bands and the capturing of the corresponding received radio wave at the selected wide frequency division band following the retrieval have been performed. Therefore, the time required to make it possible to confirm the target radio wave since the start of the retrieval of each received radio wave can be greatly shortened as compared with the time necessary for this type of known receiver.

Third Preferred Embodiment

Figure 3:
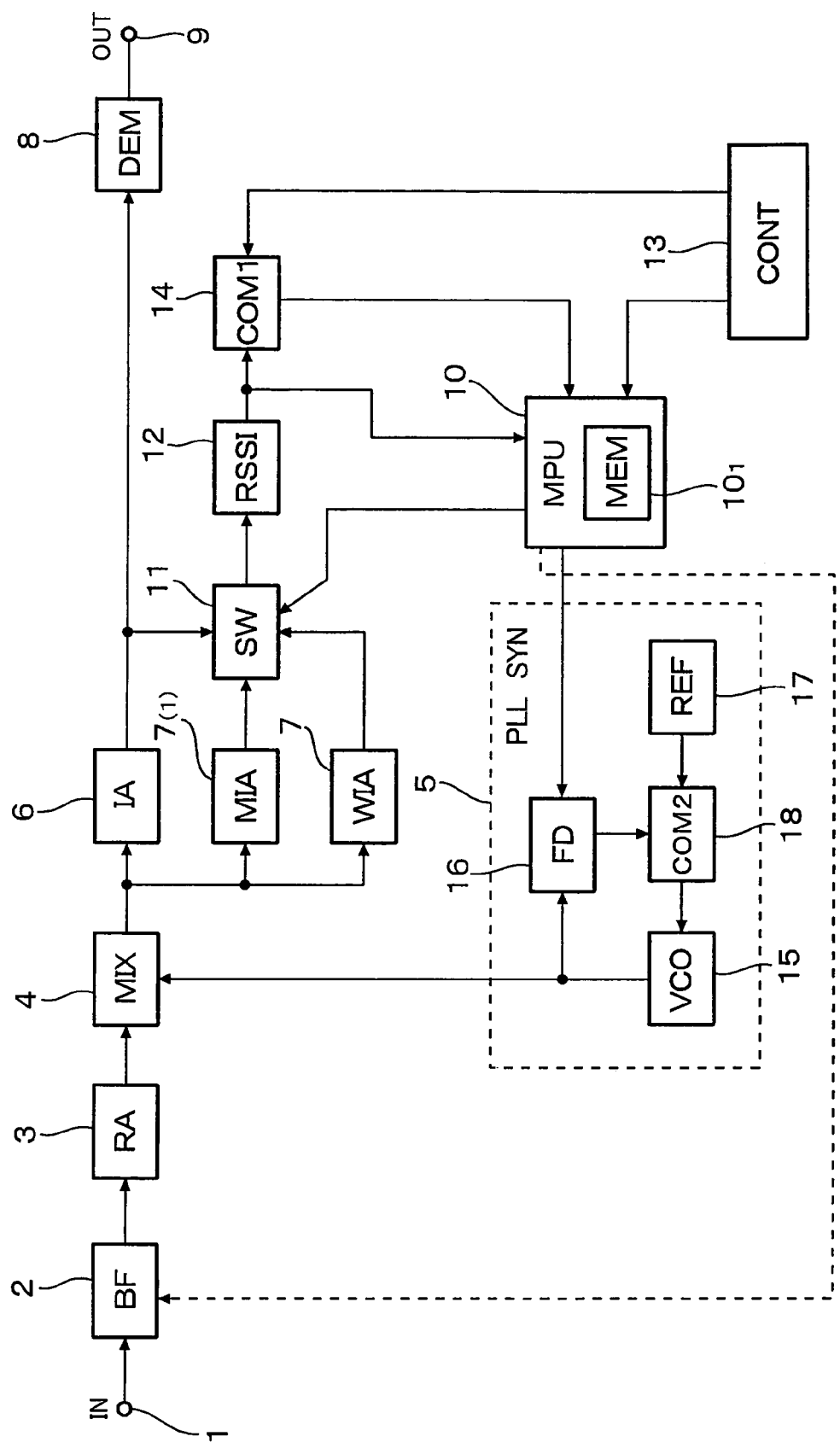
FIG. 3 shows a third embodiment of a scanning receiver according to the present invention and is a block diagram illustrating a fragmentary configuration of the scanning receiver.

Subsequently, FIG. 3 shows a third embodiment of a scanning receiver according to the present invention and is a block diagram showing a fragmentary configuration of the scanning receiver.

Looking at the difference in configuration between the scanning receiver (hereinafter called "former") according to the third embodiment and the scanning receiver (hereinafter called "latter") according to the first or second embodiment shown in FIG. 1, the former is different from the latter in that the intermediate frequency amplifier circuit of the latter comprises the first intermediate frequency amplifier (IA) 6 having the normal intermediate frequency band as the pass band, and the second wide band intermediate frequency amplifier (WIA) 7 having the intermediate frequency band equal to the wide frequency division band as the pass band, both of which are arranged in parallel, and the signal switcher 11 makes use of a two-input type in relation to its arrangement, whereas an intermediate frequency amplifier circuit of the former comprises a first intermediate frequency amplifier (IA) 6 having a normal intermediate frequency band as a pass band, a second intermediate frequency amplifier (MIA) 7(1) having an intermediate frequency band equal to a mid frequency division band as a pass band, and a third intermediate frequency amplifier (WIA) 7 having an intermediate frequency band equal to a wide frequency division band as a pass band, all of which are arranged in parallel, and a signal switcher 11 makes use of a three-input type in relation to its arrangement. However, the former is apparently identical to the latter in configuration other than above. Therefore, respective elements of structure shown in FIG. 3 are respectively given reference numerals identical to ones corresponding to the elements of structure illustrated in FIG. 1. A further description of the configuration of the former will therefore be omitted.

Figure 4:
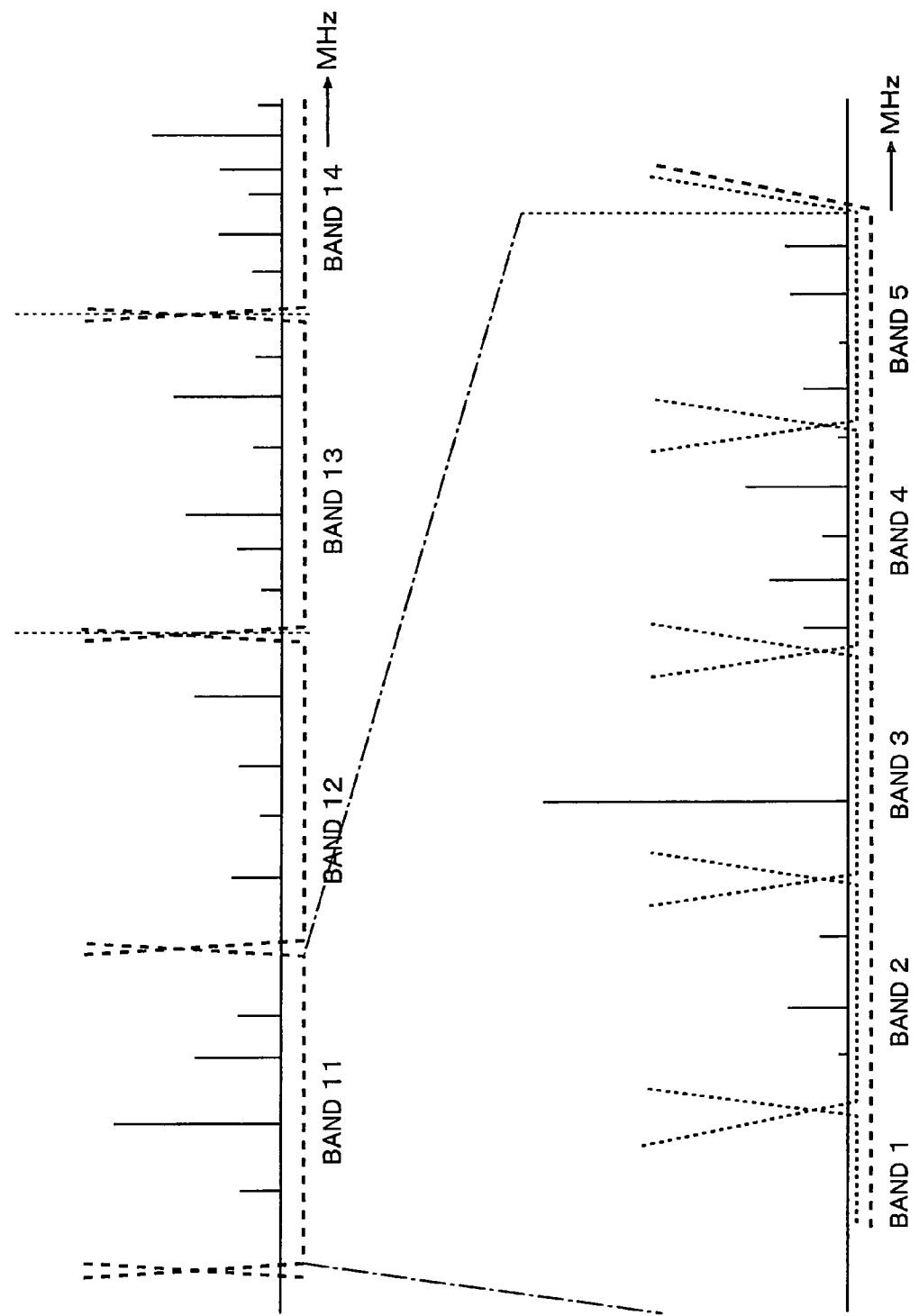
FIG. 4 is an explanatory diagram showing a state in which one frequency range is divided into a plurality of wide frequency division bands and those wide frequency division bands are further divided into a plurality of mid frequency division bands respectively.

Also FIG. 4 is an explanatory diagram showing a state in which one frequency range is divided into a plurality of wide frequency division bands and those wide frequency division bands are further divided into a plurality of mid frequency division bands respectively. In the same manner as the case of FIG. 2, all wide frequency division bands and one example illustrative of a distribution of received radio waves at respective parts of all mid frequency division bands are shown together in FIG. 4.

In FIG. 4, the direction of its horizontal axis indicates the frequency expressed in MHz. In the present example, four wide frequency division bands corresponding to bands 11, 12, 13 and 14 whose frequency bands are respectively 5 MHz, are illustrated on the upper side of FIG. 4. Further, five mid frequency division bands corresponding to bands 1, 2, 3, 4 and 5 formed by dividing one wide frequency division band 11 into five, and whose frequency bands are respectively 1 MHz, are shown on the lower side of FIG. 4. The direction of its vertical axis indicates the field intensity of a received radio wave. In the present example, the manner in which a plurality of received radio waves respectively exist in the bands 11 through 14 of the respective wide frequency division bands is shown. Further, the manner in which a plurality of received radio waves respectively exist in the bands 2 through 5 of the respective mid frequency division bands, is shown therein.

The operation of the scanning receiver according to the third embodiment will now be explained using FIGS. 3 and 4.

When a user of the scanning receiver operates a scan starting member of a controller 13 even in this case, a microprocessor 10 supplies a first wide-band division signal to a frequency divider 16 of a PLL frequency synthesizer 5 in response to the operation of the scan starting member to cause the frequency divider to frequency sweep the oscillation frequency of the PLL frequency synthesizer 5 within the first scan frequency range of 5 MHz lying within the corresponding frequency range. Further, the microprocessor 10 supplies an input switching signal to a signal switcher 11 to connect an output terminal of the wide band intermediate frequency amplifier 7 and the signal switcher 11. When a received radio wave is found to exist in the first wide frequency division band by the frequency sweeping of the PLL frequency synthesizer 5 at this time, its received signal and a frequency sweep signal are frequency-mixed at a frequency mixer 4. The resultant frequency-mixed signal is amplified by the wide band intermediate frequency amplifier 7 as a wide band intermediate frequency signal, which in turn is supplied to a received signal strength indicator 12 through the signal switcher 11.

The received signal strength indicator 12 generates a signal strength voltage indicative of a received signal strength of the received radio wave in response to the inputted wide band intermediate frequency signal. At this time, a first comparator 14 compares the signal strength voltage supplied to a first input thereof and a prescribed voltage indicative of a prescribed field intensity supplied to a second input thereof from the controller 13 and supplies a signal indicative of the result of comparison to the microprocessor 10. When the signal strength voltage of the received radio wave is indicative of being equal to or greater than a prescribed voltage, depending upon the supplied signal, the microprocessor 10 stores wide band information indicative of the corresponding wide frequency division band into a memory $10_1$.

Thereafter, the microprocessor 10 retrieves received radio waves at all remaining wide frequency division bands containing the corresponding wide frequency division band, respectively. When the received radio waves each exceeding the prescribed field intensity are found to exist in the respective wide frequency division bands upon their retrieval, the microprocessor 10 sequentially stores wide band information each indicative of the wide frequency division band into the memory $10_1$ in several each time the received radio waves each exceeding the prescribed field intensity are obtained, and completes the retrieval of the received radio waves at all the wide frequency division bands.

When the retrieval of the received radio waves at all the wide frequency division bands is terminated, the microprocessor 10 supplies an input switching signal to the signal switcher 11 to connect an output terminal of the second intermediate frequency amplifier 7(1) and the signal switcher 11. Further, the microprocessor 10 sequentially selects the wide frequency division bands having the received radio waves each exceeding the prescribed field intensity on the basis of the wide band information stored in the memory $10_1$ and retrieves the received radio waves at respective mid frequency division bands in each selected wide frequency division band in order. Upon their retrieval, the microprocessor 10 supplies a first mid band division signal to the frequency divider 16 of the PLL frequency synthesizer 5 to cause the same to frequency-sweep the oscillation frequency of the PLL frequency synthesizer 5 at the first mid frequency division band of 1 MHz in the mid frequency division bands. When a received radio wave is found to exist in the first mid frequency division band by the frequency sweeping of the PLL frequency synthesizer 5 at this time, its received signal and a frequency sweep signal are frequency-mixed at the frequency mixer 4. The resultant frequency-mixed signal is amplified by the second intermediate frequency amplifier 7(1) as a mid band intermediate frequency signal, which in turn is supplied to the received signal strength indicator 12 through the signal switcher 11.

The received signal strength indicator 12 generates a signal strength voltage indicative of a received signal strength of the received radio wave in response to the inputted mid band intermediate frequency signal. The first comparator 14 compares the signal strength voltage supplied to the first input thereof and the prescribed voltage indicative of the prescribed field intensity supplied to the second input thereof from the controller 13 and supplies a signal indicative of the result of comparison to the microprocessor 10. When the signal strength voltage of the received radio wave is indicative of being equal to or greater than the prescribed voltage, depending upon the supplied signal, the microprocessor 10 associates mid band information indicative of the corresponding mid frequency division band with the field intensity of the corresponding received radio wave and stores same into the memory $10_1$.

Thereafter, the microprocessor 10 retrieves received radio waves at all remaining mid frequency division bands containing the corresponding mid frequency division band, respectively. When the received radio waves each exceeding the prescribed field intensity are found to exist in the respective mid frequency division bands upon their retrieval, the microprocessor 10 associates mid band information each indicative of the mid frequency division band and the field intensities of the received radio waves with one another each time the received radio waves each exceeding the prescribed field intensity are obtained, and sequentially stores them into the memory $10_1$ in several. When the retrieval of the received radio waves at all the mid frequency division bands is terminated, the microprocessor 10 sequentially selects the mid frequency division bands using the mid band information stored in the memory $10_1$ under the control thereof and proceeds to the capturing of the received radio waves in the selected mid frequency division bands.

When the retrieval of the received radio waves at all the mid frequency division bands is terminated, the microprocessor 10 supplies an input switching signal to the signal switcher 11 to connect an output terminal of the first intermediate frequency amplifier 6 and the signal switcher 11. Further, the microprocessor 10 selects a corresponding mid frequency division band having a received radio wave largest in field intensity, of the received radio waves on the basis of the mid band information and field intensity information stored in the memory $10_1$ and captures each received radio wave at the selected mid frequency division band. Upon capturing thereof, the microprocessor 10 supplies a first division signal to the frequency divider 16 of the PLL frequency synthesizer 5 to cause the same to frequency-sweep the oscillation frequency of the PLL frequency synthesizer 5 at the corresponding mid frequency division band. When the corresponding received radio wave is found to exist in the mid frequency division band by the frequency sweeping of the PLL frequency synthesizer 5 at this time, its received signal and a frequency sweep signal are frequency-mixed at the frequency mixer 4. The resultant frequency-mixed signal is amplified by the first intermediate frequency amplifier 6 as an intermediate frequency signal, which in turn is supplied to the received signal strength indicator 12 through the signal switcher 11.

The received signal strength indicator 12 generates a signal strength voltage indicative of a received signal strength of a received radio wave in response to the inputted intermediate frequency signal. The first comparator 14 compares the signal strength voltage supplied to the first input thereof and a prescribed voltage indicative of a prescribed field intensity, supplied to the second input thereof from the controller 13 and supplies a signal indicative of the result of comparison to the microprocessor 10. When the signal strength voltage of the received radio wave is equal to or greater than the prescribed voltage, depending upon the supplied signal, the microprocessor 10 fixes a division signal for the frequency divider 16 of the PLL frequency synthesizer 5 under the control thereof to stop frequency sweeping of the PLL frequency synthesizer 5, thereby temporarily capturing the received radio wave at that time. The captured received signal thereof is demodulated by a demodulator 8, after which the contents of the demodulated signal is confirmed by the user.

When the received radio wave is found to be a target radio wave as a result of the confirmation of the contents thereof, the user operates a reception selecting member of the controller 13. Thus, the scanning receiver is able to continuously receive the corresponding received radio wave subsequently. On the other hand, when the received radio wave is found not to be of the target radio wave as a result of the confirmation of the contents thereof, the user operates a reception non-selecting member of the controller 13. Thus, the scanning receiver temporarily skips radio waves being in reception and continues to capture received radio waves again.

When it is not possible to confirm each received radio wave as the target radio wave even if the capturing of all received radio waves is effected on the selected mid frequency division band, the microprocessor 10 selects a mid frequency division band having a received radio wave secondly large in field intensity, of the received radio waves on the basis of the mid band information and fled intensity information stored in the memory $10_1$ and performs capturing of each received radio wave at the selected mid frequency division band. Assuming that upon capturing of the received radio waves, the target radio wave exists in the received radio waves, the microprocessor 10 is operated in such a manner that the corresponding received radio wave can subsequently be received continuously under its control. On the other hand, if the target radio wave is found not to exist in the received radio waves, then the microprocessor 10 selects a mid frequency division band having a received radio wave thirdly large in field intensity, of the received radio waves on the basis of the mid band information and field intensity information stored in the memory $10_1$ and captures each received radio wave at the selected mid frequency division band, in a manner similar to the above. If the target radio wave is found not to exist in the received radio waves even when the capturing of each received radio wave is performed, then the microprocessor 10 selects a mid frequency division band having a received radio wave next large in its field intensity and captures each received radio wave at the selected mid frequency division band. Subsequently, the microprocessor 10 repeatedly executes similar operations until the target radio wave is found out.

In the third embodiment, when it is not possible to find out the target radio wave even though the retrieval of the received radio waves at all the wide frequency division bands, the retrieval of the received radio waves at all the mid frequency division bands in the selected wide frequency division band following the retrieval, and the capturing of each received radio wave at the subsequent selected mid frequency division band are carried out respectively, it is possible to judge that the field intensity of the target radio wave is not so strong, and adjust a field intensity setting member of the controller 13 to slightly reduce a set voltage supplied to the first comparator 14, in a manner similar to the above. If such a reduced set voltage is used to carry out the retrieval of received radio waves at all the wide frequency division bands, the retrieval of received radio waves at all the mid frequency division bands in the corresponding wide frequency division band following the retrieval, and the capturing of the corresponding received radio wave at the subsequent selected mid frequency division band again, then the probability becomes high that the target radio wave will be found, as compared with before the set voltage is reduced.

Thus, according to the third embodiment, the retrieval of the received radio waves at all the wide frequency division bands, the retrieval of the received radio waves at all the mid frequency division bands in the selected wide frequency division band following the retrieval, and the capturing of the corresponding received radio wave at the subsequent selected mid frequency division band have been performed. Therefore, the time required to obtain the target radio wave since the start of the retrieval of each received radio wave can be greatly shortened as compared with the time necessary for the known sweeping receiver.

Meanwhile, any of the scanning receivers according to the first through third embodiments makes use of the single-stage frequency mixer 4 and the intermediate frequency amplifier circuit comprising the two intermediate amplifiers 6 and 7 arranged in parallel or the three intermediate frequency amplifiers 6, 7 and 7(1) arranged in parallel, switches the outputs of the intermediate frequency amplifiers 6 and 7 or the outputs of the intermediate frequency amplifiers 6, 7 and 7(1), supplies the same to the single received signal strength indicator 12, and obtains the reception strength voltage to be compared with the prescribed set voltage from the received signal strength indicator 12. However, the scanning receiver according to the present invention can be applied, in like manner, even to a scanning receiver wherein frequency mixers are arranged in two or three stages and intermediate frequency amplifiers are individually disposed on the output sides of the frequency mixers, the so-called scanning receiver wherein the frequency mixers are constructed in a double heterodyne form or a triple heterodyne form.

Fourth Preferred Embodiment

Figure 5:
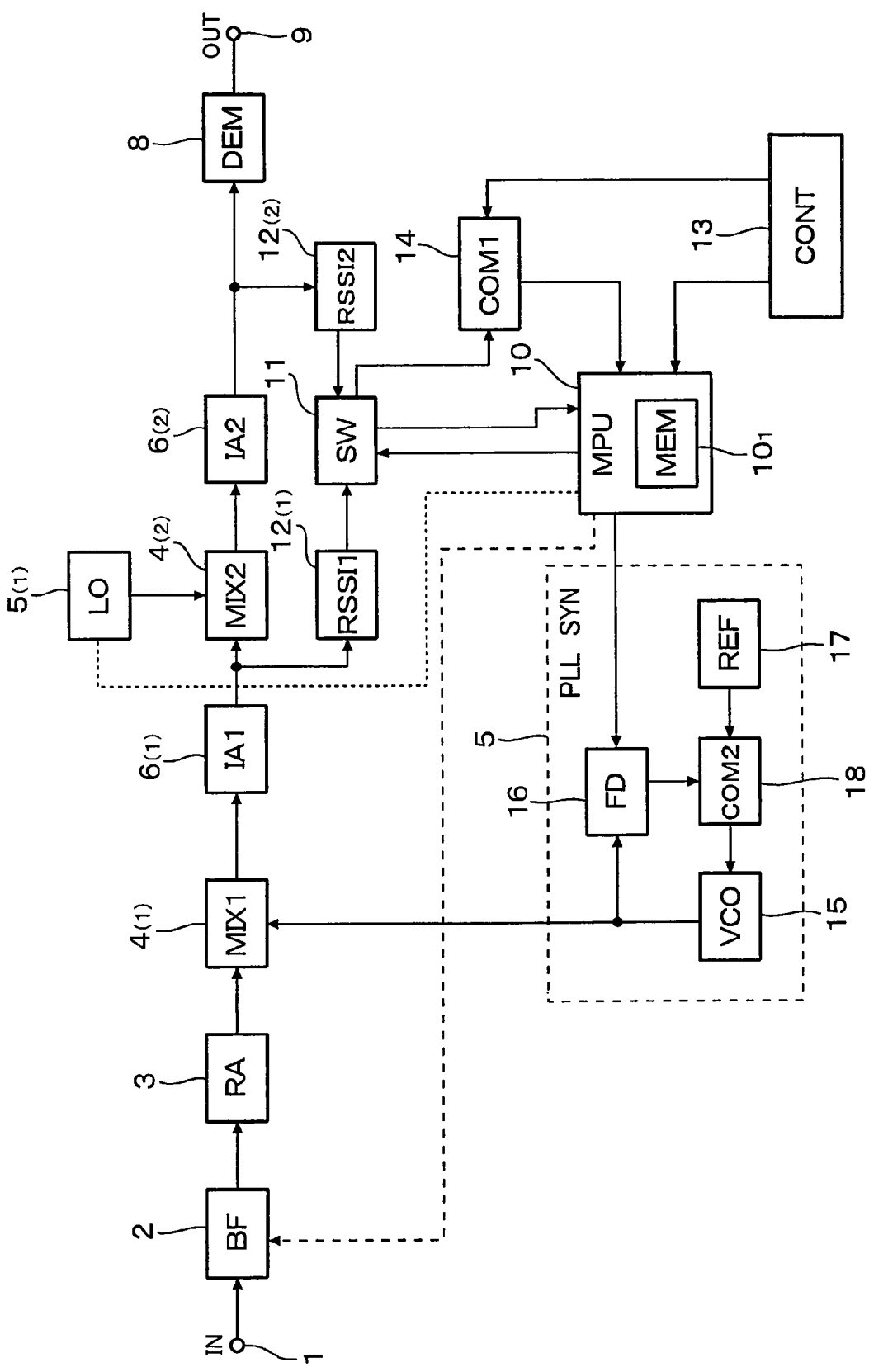
FIG. 5 shows a fourth embodiment of a scanning receiver according to the present invention and is a block diagram illustrating a fragmentary configuration of the scanning receiver.

Now, FIG. 5 shows a fourth embodiment of a scanning receiver according to the present invention and is a block diagram illustrating a fragmentary configuration of the scanning receiver. The present embodiment is equivalent to one wherein frequency converting sections are configured in a double heterodyne form, and which adapts to the scanning receiver according to the first or second embodiment in constitution.

As shown in FIG. 5, the scanning receiver according to the fourth embodiment is equipped with a first frequency mixer (MIX1) 4(1), a first intermediate frequency amplifier (IA1) 6(1), a second frequency mixer (MIX2) 4(2), a second intermediate frequency amplifier (IA2) 6(2), a local oscillator (LO) 5(1) whose oscillation frequency is controlled under the control of a microprocessor 10, a first received signal strength indicator (RSSI1) 12(1), and a second received signal strength indicator (RSSI2) 12(2). The present scanning receiver is identical in other configuration to the scanning receiver according to the first or second embodiment. In this case, a pass band of the first intermediate frequency amplifier 6(1) according to the fourth embodiment is selected so as to be identical to that of the second intermediate frequency amplifier (WIA) 7 employed in the first or second embodiment. A signal bandwidth of the second intermediate frequency amplifier 6(2) employed in the fourth embodiment is selected so as to be identical to that of the first intermediate frequency amplifier (IA) 6 employed in the first or second embodiment.

In the scanning receiver according to the fourth embodiment, the first frequency mixer 4(1) has a first input terminal connected to an output terminal of a high frequency amplifier 3, a second input terminal connected to an output terminal of a PLL frequency synthesizer 5, and an output terminal connected to an input terminal of the first intermediate frequency amplifier 6(1). The first intermediate frequency amplifier 6(1) has an output terminal connected to both a first input terminal of the second frequency mixer 4(2) and an input terminal of the first received signal strength indicator 12(1). The second frequency mixer 4(2) has a second input terminal connected to an output terminal of the local oscillator 5(1), and an output terminal connected to an input terminal of the second intermediate frequency amplifier 6(2). The second intermediate frequency amplifier 6(2) has an output terminal connected to both an input terminal of a demodulator 8 and an input terminal of the second received signal strength indicator 12(2). The first received signal strength indicator 12(1) has an output terminal connected to a first switching input terminal of a signal switcher 11, whereas the second received signal strength indicator 12(2) has an output terminal connected to a second switching input terminal of the signal switcher 11. A connection layout other than these is identical to that of the scanning receiver according to the first or second embodiment.

Since the operation of the scanning receiver according to the fourth embodiment based on the above construction is basically identical to that of the scanning receiver according to the first or second embodiment, a detailed operational description about the scanning receiver according to the fourth embodiment is omitted. However, the fourth embodiment is slightly different from the first or second embodiment in points to be mentioned below. That is, they reside in that when the retrieval of received radio waves at respective wide frequency division bands is performed, the scanning receiver according to the fourth embodiment supplies a first intermediate frequency signal outputted from the first intermediate frequency amplifier 6(1) to the first received signal strength indicator 12(1) and determines using a reception strength voltage obtained from the first received signal strength indicator 12(1) whether the signal strength of a received radio wave is equal to or greater than a prescribed value, and when the capturing of each received radio wave at the selected wide frequency division band is carried out, the scanning receiver supplies a second intermediate frequency signal outputted from the second intermediate frequency amplifier 6(2) to the second received signal strength indicator 12(2) and determines using a reception strength voltage obtained from the second received signal strength indicator 12(2) whether the signal strength of a received radio wave is equal to or greater than a prescribed value, so-called paths for judging the signal strengths of the received radio waves are different between the scanning receiver according to the fourth embodiment and the scanning receiver according to the first or second embodiment. However, even if the paths for determining the signal strengths of the received radio waves are different, they do not exert any influence on the result of determination of the signal strength of each received radio wave.

According to the scanning receiver showing the fourth embodiment, it is no different from the scanning receiver according to the first or second embodiment in terms of the result of determination of the signal strength of each received radio wave although it is slightly different from the scanning receiver according to the first or second embodiment in terms of the paths for determining the signal strengths of the received radio waves. Therefore, advantageous effects obtained by the scanning receiver of the fourth embodiment are also substantially identical to those obtained by the scanning receiver according to the first or second embodiment.

Fifth Preferred Embodiment

Figure 6:
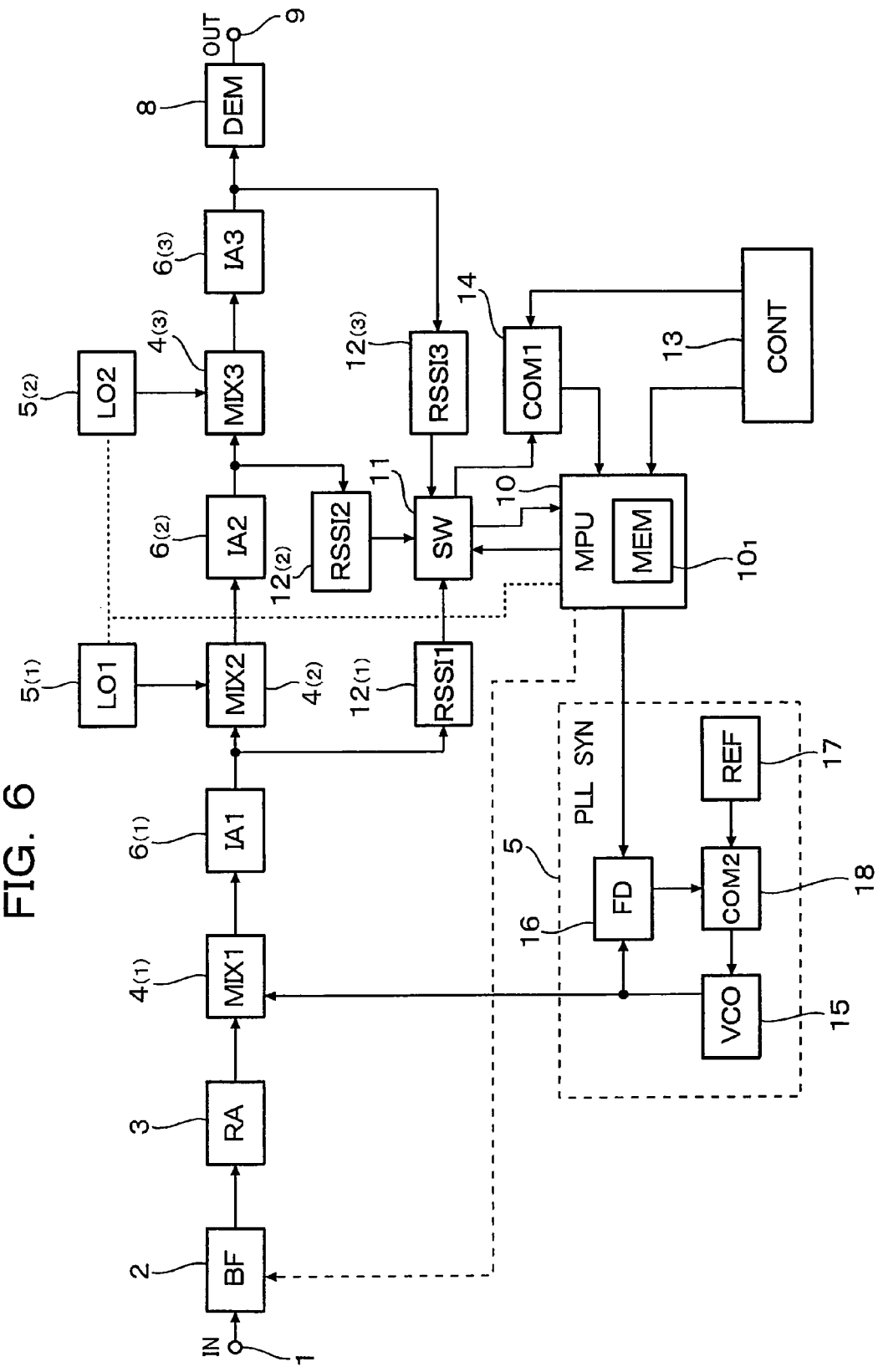
FIG. 6 shows a fifth embodiment of a scanning receiver according to the present invention and is a block diagram depicting a fragmentary configuration of the scanning receiver.

Next, FIG. 6 shows a fifth embodiment of a scanning receiver according to the present invention and is a block diagram showing a fragmentary configuration of the scanning receiver. The present embodiment is equivalent to one wherein frequency converting sections are configured in a triple heterodyne form and which adapts to the scanning receiver according to the third embodiment in constitution.

As shown in FIG. 6, the scanning receiver according to the fifth embodiment is equipped with a first frequency mixer (MIX1) 4(1), a first intermediate frequency amplifier (IA1) 6(1), a second frequency mixer (MIX2) 4(2), a second intermediate frequency amplifier (IA2) 6(2), a first local oscillator (LO1) 5(1) whose oscillation frequency is controlled under the control of a microprocessor 10, a third frequency mixer (MIX2) 4(3), a third intermediate frequency amplifier (IA3) 6(2), a second local oscillator (LO2) 5(2) whose oscillation frequency is controlled under the control of the microprocessor 10 in like manner, a first received signal strength indicator (RSSI1) 12(1), a second received signal strength indicator (RSSI2) 12(2), and a third received signal strength indicator (RSSI3) 12(3). The present scanning receiver is identical in other configuration to the scanning receiver according to the third embodiment. In this case, a pass band of the first intermediate frequency amplifier 6(1) according to the fifth embodiment is selected so as to be identical to that of the third intermediate frequency amplifier (WIA) 7 employed in the third embodiment. A pass band of the second intermediate frequency amplifier 6(2) according to the fifth embodiment is selected so as to be identical to that of the second intermediate frequency amplifier (MIA) 7(1) according to the third embodiment. Further, a pass band of the third intermediate frequency amplifier 6(3) according to the fifth embodiment is selected so as to be identical to that of the first intermediate frequency amplifier (IA) 6 according to the third embodiment.

In the scanning receiver according to the fifth embodiment, the first frequency mixer 4(1) has a first input terminal connected to an output terminal of a high frequency amplifier 3, a second input terminal connected to an output terminal of a PLL frequency synthesizer 5, and an output terminal connected to an input terminal of the first intermediate frequency amplifier 6(1). The first intermediate frequency amplifier 6(1) has an output terminal connected to both a first input terminal of the second frequency mixer 4(2) and an input terminal of the first received signal strength indicator 12(1). The second frequency mixer 4(2) has a second input terminal connected to an output terminal of the first local oscillator 5(1), and an output terminal connected to an input terminal of the second intermediate frequency amplifier 6(2). The second intermediate frequency amplifier 6(2) has an output terminal connected to both an input terminal of the third frequency mixer 4(2) and an input terminal of the second received signal strength indicator 12(2). The third frequency mixer 4(3) has a second input terminal connected to an output terminal of the second local oscillator 5(2) and an output terminal connected to both an input terminal of a demodulator 8 and an input terminal of the third received signal strength indicator 12(3). The first received signal strength indicator 12(1) has an output terminal connected to a first switching input terminal of a signal switcher 11, whereas the second received signal strength indicator 12(2) has an output terminal connected to a second switching input terminal of the signal switcher 11. The third received signal strength indicator 12(3) has an output terminal connected to a third switching input terminal of the signal switcher 11. A connection layout other than these is identical to that of the scanning receiver according to the third embodiment.

Since the operation of the scanning receiver according to the fifth embodiment based on the above construction is basically identical to that of the scanning receiver according to the third embodiment, a detailed operational description about the scanning receiver according to the fifth embodiment is omitted. However, the fifth embodiment is slightly different from the third embodiment in points to be mentioned below. That is, they reside in that when the retrieval of received radio waves at respective wide frequency division bands is performed, the scanning receiver according to the fifth embodiment supplies a first intermediate frequency signal outputted from the first intermediate frequency amplifier 6(1) to the first received signal strength indicator 12(1) and determines using a reception strength voltage obtained from the first received signal strength indicator 12(1) whether the signal strength of a received radio wave is equal to or greater than a prescribed value, and when the retrieval of received radio waves at respective mid frequency division bands in the selected wide frequency division band is carried out, the scanning receiver supplies a second intermediate frequency signal outputted from the second intermediate frequency amplifier 6(2) to the second received signal strength indicator 12(2) and determines using a reception strength voltage obtained from the second received signal strength indicator 12(2) whether the signal strength of a received radio wave is equal to or greater than a prescribed value, and further when the capturing of each received radio wave at the selected wide frequency division band is carried out, the scanning receiver supplies a third intermediate frequency signal outputted from the third intermediate frequency amplifier 6(3) to the third received signal strength indicator 12(3) and determines using a reception strength voltage obtained from the third received signal strength indicator 12(3) whether the signal strength of a received radio wave is equal to or greater than a prescribed value, so-called paths for judging the signal strengths of the received radio waves are different between the scanning receiver according to the fifth embodiment and the scanning receiver according to the third embodiment. However, even if the paths for determining the signal strengths of the received radio waves are different, they do not exert any influence on the result of determination of the signal strength of each received radio wave.

According to the scanning receiver showing the fifth embodiment, it is no different from the scanning receiver according to the third embodiment in terms of the result of determination of the signal strength of each received radio wave although it is slightly different from the scanning receiver according to the third embodiment in terms of the paths for determining the signal strength of each received radio wave. Therefore, advantageous effects obtained by the scanning receiver of the fifth embodiment are substantially identical to those obtained by the scanning receiver according to the third embodiment.

Although the first, second and fourth embodiments respectively have illustrated their explanations by citing the example in which the wide frequency division band is set to 1 MHz, and the third and fifth embodiments respectively have illustrated their explanations by citing the example in which the wide frequency division band is set to 5 MHz and the mid frequency division band is set to 1 MHz respectively, no limitations are imposed on their frequency bands even though any of their frequency bands is of a preferable frequency band. That is, since the wide frequency division bands of the respective embodiments referred to above, and the wide frequency division bands and mid frequency division bands of the respective embodiments referred to above are often determined depending upon radio wave environments at the points of reception of radio waves and the functions or the like of scanning receivers to be used, the wide frequency division bands and the wide frequency division bands and mid frequency division bands are not determined uniquely. They may also be set to ones each having a predetermined frequency band setting range containing the preferable frequency bands.

When only the wide frequency division band is utilized, for example, approximately 0.5-5.0 MHz can be selected as a preferable frequency band. When the wide frequency division band and mid frequency division band are used in combination with each other, approximately 5.0-30.0 MHz can be selected as a preferable frequency band for the wide frequency division band, whereas approximately 0.3-2.0 MHz can be selected as a preferable frequency band for the mid frequency division band.

While the preferred forms of the present invention have been described, it is to be understood that modifications will be apparent to those skilled in the art without departing from the spirit of the invention. The scope of the invention is to be determined solely by the following claims.

What is claimed is:

1. A scanning receiver comprising:

a PLL frequency synthesizer used to generate a local oscillation signal; and a microprocessor, said local oscillation signal being swept under the control of said microprocessor to perform retrieval of field intensities of received radio waves and sweeping of receive frequencies thereof, wherein said microprocessor sets a plurality of wide frequency division bands in which a receivable full frequency range is divided into predetermined frequency ranges and retrieves the field intensities of the received radio waves using the output of an intermediate frequency amplifier circuit over the set wide frequency division bands in order, wherein when a received radio wave having a field intensity greater than or equal to a prescribed level is obtained by said retrieval, said microprocessor sweeps the receive frequencies from one end of the corresponding wide frequency division band to the other end thereof, wherein when a target radio wave is capable of being captured upon said sweeping, said microprocessor proceeds to the operation of receiving the target radio wave, and wherein when the target radio wave is not obtained, said microprocessor performs the retrieval of the field intensities of the received radio waves and the sweeping of the receive frequencies following the retrieval on the non-retrieved wide frequency division bands in order to thereby capture a corresponding target radio wave.

* * * * *